Nov. 2, 1937.  H. BECKER  2,097,752
WORKSHOP MICROSCOPE
Filed March 18, 1935
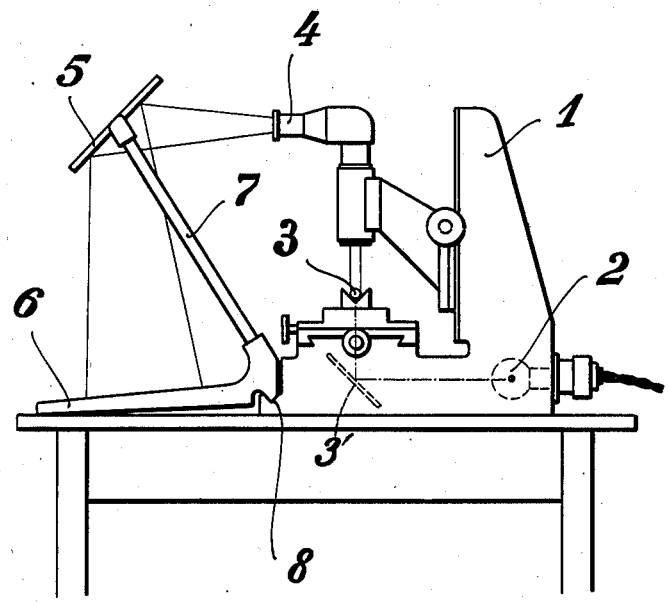
Helmut Becker
INVENTOR
BY
ATTORNEY Patented Nov. 2, 1937

2,097,752

UNITED STATES PATENT OFFICE 2,097,752

WORKSHOP MICROSCOPE

Helmut Becker, Wetzlar, Germany, assignor to Ernst Leitz G. m. b. H., Wetzlar, Germany Application March 18, 1935, Serial No. 11,569
In Germany March 19, 1934

1 Claim. (Cl. 88—24)

This invention relates to improvements in microscopes, particularly microscopes used in workshops or the like localities, and it is the principal object of my invention to provide the microscope with a horizontally arranged object table so that the operator can comfortably sit at a table in front of the microscope and may conveniently trace the picture of an object projected upon a projection plate.

Another object of my invention is the provision of a workshop microscope with which the projection device is suitably and readily combinable.

Still another object of my invention is the provision of a workshop microscope equipped with an angularly disposed mirror combined with the projection plate by means of a suitably constructed supporting rod.

A further object of my invention is the provision of a workshop microscope, the foot of which is suitably grooved for the proper engagement by the frame of the projection plate.

A still further object of my invention is the provision of a device of the above described character which is comparatively simple and therefore inexpensive in its construction, yet durable and highly efficient in use, particularly in view of the horizontal arrangement of the object table or holder doing away with the necessity of fastening the object thereon as is required with the known devices of this kind in which the object is held by a vertical holder to which it must be specifically secured.

These and other objects and advantages of my invention will become more fully known as the description thereof proceeds, and will then be specifically defined in the appended claim.

In the accompanying drawing forming a material part of this disclosure:

The single figure is a side elevation of a workshop microscope constructed according to my invention, and illustrates its arrangement upon a table.

As illustrated, the workshop microscope, generally designated 1, and including its lamp 2 and object holder 3, as well as a mirror 3' reflecting the light of lamp 2 onto said holder 3, has combined therewith a projection objective 4 projecting the image of the object by the intermediary of the angularly disposed mirror 5 upon a substantially horizontally arranged plate 6 on which it may conveniently be traced.

The mirror 5 is connected to the plate 6 by means of a preferably inclined or angularly disposed supporting rod 7.

The rear face of the plate 6 is suitably shaped so as to simply engage a groove in the foot part of the microscope, as indicated at 8 so as to permit a ready lateral adjustment of the projection device to the microscope.

In use, my microscope has the decided advantage over the workshop microscopes at present on the market that the projection device is readily adjustable to the microscope and the image of the horizontally disposed object holder is conveniently projected upon a plate by means of an inclined mirror so as to allow its ready tracing.

It will be understood that I have described and shown the preferred form of my invention as one example only of the many possible ways to practically construct the same, and that I may make such changes in its general arrangement and in the construction of the minor details thereof as come within the scope of the appended claim without departure from the spirit of my invention and the principles involved.

Having thus described my invention what I claim as new and desire to secure by Letters Patent is:

In a workshop microscope, a microscope member, a foot part for said member having a laterally extending groove in its inner end and adapted to be supported on a table, and including a lamp and an object holder, a reflector below said object holder to reflect the light of said lamp onto a projection objective combined with said microscope, an angularly disposed mirror upon which the image of the object on its holder is projected by said objective, a plate means adapted to be positioned on said table onto which the image of the object is reflected from said angularly disposed mirror to be traced on said plate, and an inclined rod supporting said angularly disposed mirror at its upper end and secured at its lower end in the frame of said plate, said plate having a projection on its lower, outer end below said objective to engage in the groove in the foot part of the microscope to permit a ready manual adjustment of the angularly disposed mirror relatively to the microscope.

HELMUT BECKER.